June 21, 1955     W. B. DEUEL     2,711,028
ATTACHMENT FOR INSIDE MICROMETER CALIPERS
Filed April 27, 1954
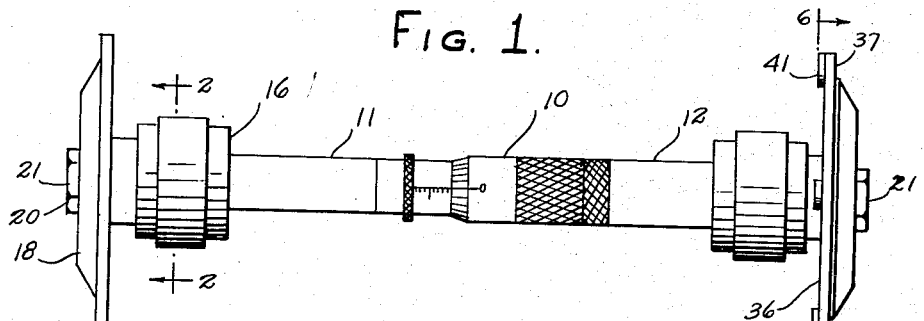
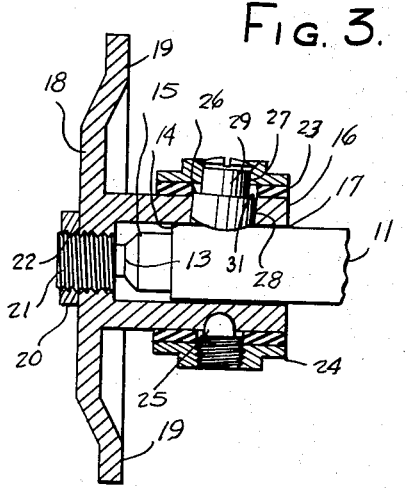
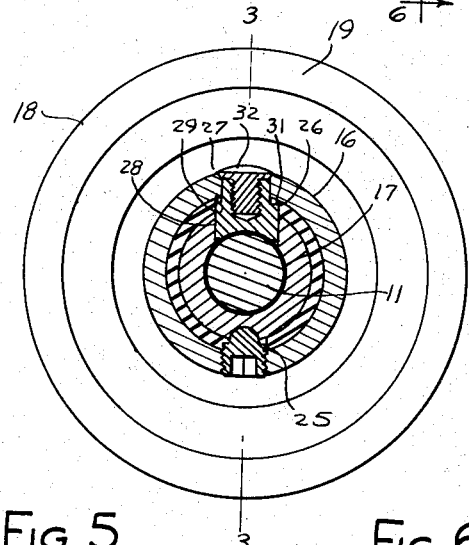
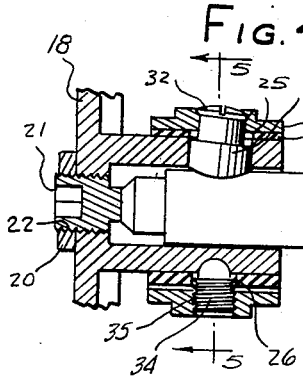
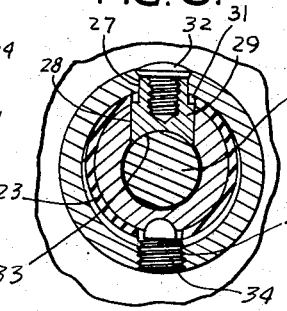
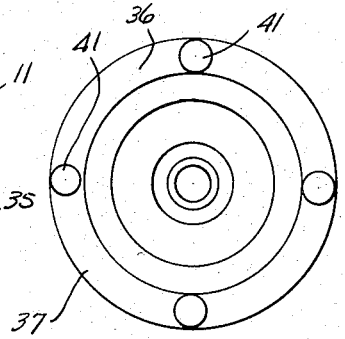
INVENTOR
WILLARD B. DEUEL,
BY
*McMorrow, Berman + Davidson*
ATTORNEYS United States Patent Office 2,711,028
Patented June 21, 1955

2,711,028

ATTACHMENT FOR INSIDE MICROMETER CALIPERS

Willard B. Deuel, Grand Rapids, Mich.

Application April 27, 1954, Serial No. 425,799

2 Claims. (Cl. 33—167)

The present invention relates generally to measuring tools and specifically to an attachment for one or both ends of an inside micrometer caliper for adapting the caliper to measure outside surfaces, depth of bores and the like, which measurements are not possibly made with inside calipers as now constructed.

Frequently outside calipers of the length of span desired are not available when a shoulder or other space between two surfaces is to be measured, and simple inside micrometer calipers, with their measuring rods of various lengths to accommodate different inside measurement, are usually at hand and with rods long enough to extend over the span to be measured. Other distances, such as the depth of a bore in a body measured from a shoulder or body face, cannot be measured with an outside caliper at all, nor with an inside caliper without some adaptation or attachment to convert one end to an outside caliper.

It is, therefore, the principal object of the present invention to provide an attachment for inside calipers which may be used on one or both ends for special measurements of outside or combination inside and outside surfaces.

It is another object of the present invention to provide an attachment for inside micrometer calipers of the type that have measuring rods of various lengths each demountably attachable to the micrometer head, and one that does not alter, deface, mark or otherwise change the measuring rod upon which it is removably mounted.

A further object of the present invention is to provide a device which may be attached to the rod at either end of the micrometer head and which has an adjusting screw so that a single adjustment may be made to secure the device on the rod so that an inwardly facing surface is in exact alignment with the end face of the measuring rod used.

Yet another object of the present invention is to provide a cylindrical extension with a bore to receive the measuring rod of the inside caliper and in which the clamping means is biased against the rod by a resilient sleeve, and in which the clamping means is so disposed so as to bias the rod into the bore for secure contact of the rod end face on the adjusting screw.

These and other objects and advantages of the present invention will be fully apparent upon consideration of the following description when taken in connection with the annexed drawings, in which like numerals indicate like parts throughout the several views, and in which:

Fig. 1 is a plan view in elevation of the present invention,

Fig. 2 is an end view in cross section taken on line 2—2 of Fig. 1,

Fig. 3 is a side view partially in cross section of one portion of the present invention, Fig. 4 is a fragmentary view in cross section showing in exaggerated form the angular displacement of the clamping pin of the invention, Fig. 5 is an end view in cross section taken on line 5—5 of Fig. 4, and Fig. 6 is an end view in elevation of one of the annular faces of the invention as taken on line 6—6 of Fig. 1.

Referring in more detail to the drawing, it will be seen in Figure 1 that a micrometer caliper of the type known as the inside micrometer has a head 10 to which are attached at either end the measuring rods 11, 12, each of which terminates in an end face 13, best shown in Figure 3, and being precisely ground on that face so that the micrometer may be used to measure inside diameters of bores, holes, castings or the like between two such faces. The measuring rods 11, 12, are most generally formed with shoulders 14 and chamfered end edges 15.

The present invention consists of a cylindrical body 16, one for each measuring rod 11, 12, having a bore 17 at the one end and being formed with a circular plate 18 at the other. The plate 18 is dished to form on one side an annular face 19, the surface of which is ground flat and true, and by means of the locking nut 20 and the adjusting screw 21 in the aperture 22 in the other side of the plate, the annular face 19 may be accurately aligned with the end face of the measuring rod 11, 12 as the case may be.

The cylindrical body 16 has a sleeve 23 on it, made of rubber, plastic, or any other material which is resilient, and a clamping ring 24 is circumferentially disposed around the sleeve 23 which has a hole 25, 26 on each side. On one side of the clamping ring 24 is an aperture 27 which is disposed at a small angle away from the vertical relative to the longitudinal axis of the body 16 which is also provided with an aperture 28 at that point similarly inclined, best shown in exaggerated form in Figure 4. The aperture 28 is somewhat larger than the aperture 27, and a clamping pin 29 having a shoulder abutment 31 is held in the apertures by a flat headed screw 32 of slightly larger diameter than the smaller aperture 27.

The clamping pin 29 has a curved end face 33 which exactly matches the cylindrical surface of the rod 11, 12 and upon which it bears when a setscrew 34 in the aperture 35 on the opposite side of the clamping ring 24 is screwed in to press the body 16 and ring 29 apart on that side, resulting in compression of the sleeve 23 on the other. This compression of the sleeve 23 on the side of the clamping pin 29 results in pressure of the curved end face 33 on the rod 11 or 12, and due to the slight angle from the vertical, the clamping pin 29 tends to move the rod in the bore in the direction of the adjusting screw 21, at least as far as it will go, insuring a snug and accurate contact.

The other measuring rod 12 has a similarly constructed body 16, but the annular face 36 of the plate 37 is formed with a plurality of projections 41, each being ground to an accurate face and being spaced equidistantly around the face 36. In this form, the projections 41 are aligned with the end face of rod 12, in most cases of measurement for the reason that most surfaces being measured have minute irregularities which would give wrong readings if measured between long arcs of each annular face 19 and 36, and by using the one face 19 and a spot engagement as on the projection 41, the effect of surface irregularity is minimized.

When desired, the annular face 36 can be adjusted by the screw 21 to have its surface between the projections 41 in alignment with the end face of the projecting rod 12.

Obviously, the distance between the annular face 19 and the face 36 or its projections 41 is the same as the distance between the ends of the measuring rods used and may be read on the micrometer, the rods being accurately dimensioned and marked with their lengths, which is added to the length of the micrometer head 10, plus its reading. It will be readily seen that one end of the caliper may be used with a rod only, and the attachment of this invention may be made to one end only for the purpose of measuring the depth of a bore, the rod going into the bore and the annular face 19 or 36 then contacting the top edge of whatever is to be measured.

While a single embodiment of the present invention has been here illustrated and described, other embodiments are contemplated and many changes may be made herein without departing from the spirit and scope of the invention as set forth in the appended claims.

What is claimed is:

1. An attachment for an inside micrometer caliper for use in measuring outside surfaces comprising a pair of cylindrical bodies each having a bore extending inwardly from one end thereof, said bores being adapted and arranged to slidably receive one each of the measuring rods on the opposed ends of an inside micrometer head, each of said bodies being formed at the end remote from said bore with an axially disposed circular plate having an annular face on its one side adjacent said body and having a threaded aperture on the other side connecting with said bore, an adjusting screw threadedly received in said aperture and adapted and arranged to bear against the end face of a measuring rod in said bore for positioning said annular face relative to said rod end face, a resilient sleeve on each of said bodies, a clamping ring circumferentially disposed on said sleeve, setscrew means in one side of said ring engageable with said body on one side thereof, said ring and said body being formed with aligned apertures on their sides opposite said setscrew means, the aperture in said ring being of lesser diameter than that in said body, a clamping pin disposed in said apertures and being formed with a shoulder abutment at one end preventing movement through the aperture in said ring, said pin being formed with a curved end face at the other end adapted and arranged to bear against the rod in said bore when said setscrew means moves said ring on said body against the resilience of said sleeve, said sleeve being formed with holes on each side to receive said setscrew means and said pin.

2. An attachment for an inside micrometer caliper for use in measuring outside surfaces comprising a pair of cylindrical bodies each having a bore extending inwardly from one end thereof, said bores being adapted and arranged to slidably receive one each of the measuring rods on the opposed ends of an inside micrometer head, each of said bodies being formed at the end remote from said bore with an axially disposed circular plate having an annular face on its side adjacent said body and having a threaded aperture on the other side connecting with said bore, an adjusting screw threadedly received in said aperture being adapted and arranged to bear against the end face of a measuring rod in said bore for positioning said annular face relative to said rod end face, the annular face of one of said bodies being formed with outwardly projecting measuring faces equidistantly disposed thereon, a resilient sleeve on each of said bodies, a clamping ring circumferentially disposed on said sleeve, a setscrew threadedly secured in said ring on one side thereof, said body being formed on one side with a recess receiving said setscrew, said ring and said body being formed on the side opposite said setscrew with aligned apertures, the aperture in said ring being of lesser diameter than the aperture in said body, said aligned apertures in said ring and in said body being disposed at a small angle to vertical relative to the longitudinal axis of said body and said ring, with a clamping pin disposed in said apertures and being formed with a shoulder abutment at one end coacting with the aperture in said ring to prevent movement outwardly from said body aperture, said pin being formed at the other end with a curved end face adapted and arranged to engage the rod in said bore when said setscrew moves said ring on said body against the resilience of said sleeve, said clamping pin being disposed at the angle of said aligned apertures whereby the rod in said bore is clamped therein by said pin with pressure tending to move said rod toward said adjusting screw, said sleeve being formed with holes on each side to receive said setscrew and said pin.

References Cited in the file of this patent

UNITED STATES PATENTS

| 2,456,709 | Kemp | Dec. 21, 1948 |
| 2,620,567 | McClish | Dec. 9, 1952 |

FOREIGN PATENTS

| 584,078 | Great Britain | Jan. 7, 1947 |